United States Patent
Lennartson et al.

(10) Patent No.: US 8,965,320 B2
(45) Date of Patent: Feb. 24, 2015

(54) METHOD AND ARRANGEMENT FOR ENABLING IMPROVED RECEIVER QUALITY FOR NOISE LIMITED UPLINK SIGNALS

(75) Inventors: Benny Lennartson, Hägersten (SE); Miguel Lopez, Solna (SE); Kenneth Sandberg, Ekerö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 800 days.

(21) Appl. No.: 13/127,280

(22) PCT Filed: Nov. 4, 2008

(86) PCT No.: PCT/SE2008/051258
§ 371 (c)(1),
(2), (4) Date: May 3, 2011

(87) PCT Pub. No.: WO2010/053412
PCT Pub. Date: May 14, 2010

(65) Prior Publication Data
US 2011/0212741 A1   Sep. 1, 2011

(51) Int. Cl.
*H04B 1/10* (2006.01)
*H04L 1/06* (2006.01)
*H04L 1/00* (2006.01)
*H04W 88/08* (2009.01)

(52) U.S. Cl.
CPC ............... *H04L 1/06* (2013.01); *H04L 1/0036* (2013.01); *H04W 88/08* (2013.01)
USPC ...................................... 455/303

(58) Field of Classification Search
USPC ............ 455/10, 501, 61, 63.1, 561, 296, 303; 370/431, 442, 443, 437, 458, 317, 319, 370/324, 436, 310, 329, 345, 347, 348, 459
See application file for complete search history.

(56) References Cited

U.S. PATENT DOCUMENTS

| | | | |
|---|---|---|---|
| 6,256,505 B1 * | 7/2001 | Kingdon et al. | 455/456.2 |
| 6,363,262 B1 * | 3/2002 | McNicol | 455/561 |
| 6,449,246 B1 * | 9/2002 | Barton et al. | 370/210 |
| 6,928,048 B1 * | 8/2005 | Do et al. | 370/208 |
| 7,362,799 B1 * | 4/2008 | Petrus | 375/224 |
| 2002/0077154 A1 * | 6/2002 | Judson et al. | 455/562 |
| 2003/0079170 A1 * | 4/2003 | Stewart et al. | 714/755 |
| 2003/0162566 A1 * | 8/2003 | Shapira et al. | 455/561 |
| 2004/0214608 A1 * | 10/2004 | Mostafa et al. | 455/562.1 |
| 2008/0174470 A1 * | 7/2008 | Lum et al. | 342/16 |
| 2009/0061938 A1 * | 3/2009 | Ulbricht et al. | 455/561 |

FOREIGN PATENT DOCUMENTS

| | | |
|---|---|---|
| EP | 2107706 A1 | 10/2009 |
| WO | 02/11301 A2 | 2/2002 |
| WO | 2008/089179 A1 | 7/2008 |

* cited by examiner

*Primary Examiner* — Nay A Maung
*Assistant Examiner* — Mark Woodall
(74) *Attorney, Agent, or Firm* — Coats & Bennett, P.L.L.C.

(57) ABSTRACT

In a method for enabling improved quality for noise limited uplink signals in a radio base station in a telecommunication system, said radio base station comprising a plurality of transceiver units, each comprising at least one receiver unit, adaptively allocating (S10) available transceiver units to enable parallel processing of an identified noise limited signal on at least two separate receiver units in the radio base station. And, combining (S20) the parallel processed noise limited calls to provide a received signal with improved signal to noise ratio.

14 Claims, 7 Drawing Sheets

METHOD AND ARRANGEMENT FOR ENABLING IMPROVED RECEIVER QUALITY FOR NOISE LIMITED UPLINK SIGNALS

Patent publication WO 02/11301 discloses utilizing signal delay and combing techniques with multipath signals to provide multipath diversity gain within CDMA over-the-air repeater and low noise amplifier systems.

TECHNICAL FIELD

The present invention relates to noise mitigation in general, and specifically to methods and arrangements for improving quality for noise limited calls or signals in the uplink in telecommunication systems.

BACKGROUND

Sensitivity in GSM (Global System for Mobile communication) Base Transceiver Station (BTS) receivers is crucial since the power budget depends upon it. A typical, schematic GSM network is shown in FIG. 1. When considering the link budget for several networks, it is often seen that the uplink is the limiting link, e.g. from user equipment (UE) to base station (BTS). Consequently, it is typically the uplink that breaks first if a user moves to the boundary of a cell. Thus, improving the uplink will improve the cell coverage for most networks. This will lead to reduced number of sites needed to deploy and thus give savings from site rental and hardware.

The sensitivity of a receiver is limited by several factors, some of the most prominent include:
- Thermal noise in the equipment (background noise, tower mounted amplifiers (TMA), feeders, radio unit receivers etc)
- Spurious emission from other transmitters (mobile phones and other base stations)
- Non-linearity that originates from strong interference sources.

Most base transceiver stations covering macro cells use a concept of two-way-diversity to improve the uplink signal. This means that two separate antenna paths are used all the way from the antenna into the receiver; see FIG. 2. The signals from the two antenna branches are combined in the transceiver (receiver) and a sensitivity gain is obtained. This gain consists of two parts, a diversity gain, and a power gain:
- The diversity gain is achieved because having two or more signals makes it possible to mitigate the adverse effects of fading.
- The power gain stems from the fact that it is possible to coherently combine the signals in the receiver, thus increasing the signal to noise ratio (SNR). The improvement is theoretically 3 dB, although in practice there are always implementation losses.

For GSM systems, a TRX (Transceiver) provides the radio gain path for one GSM carrier. GSM systems typically use a time-division multiplexing scheme in which each carrier is divided into 8 timeslots in the air. A TRX typically contains one transmitter and one receiver. The receiver can manage the above described 2-way diversity.

In a noise limited system, the receiver sensitivity in the uplink cannot, in any known manner, be improved without adding extra antennas, feeders or other hardware units to the site e.g. base transceiver station.

SUMMARY

An object to the present invention is to provide methods and arrangements for noise mitigation, which is enabled without the need for additional hardware.

Basically, a method of enabling improved quality for noise limited uplink signals in a radio base station in a telecommunication system, where the radio base station comprises a plurality of transceiver units, each comprising at least one receiver unit, includes the steps of adaptively allocating (S10) available transceiver units to enable parallel processing of an identified noise limited signal on at least two separate receiver units in said radio base station, and subsequently combining (S20) said parallel processed noise limited calls to provide a received signal with improved signal to noise ratio.

Advantages of the Present Invention Include:
Improved SNR for calls that are noise limited, resulting in improved coverage.
Better sensitivity is achieved by means of a more efficient utilization of available resources.

BRIEF DESCRIPTION OF THE DRAWINGS

The invention, together with further objects and advantages thereof, may best be understood by referring to the following description taken together with the accompanying drawings, in which.

ABBREVIATIONS

Figure 1:
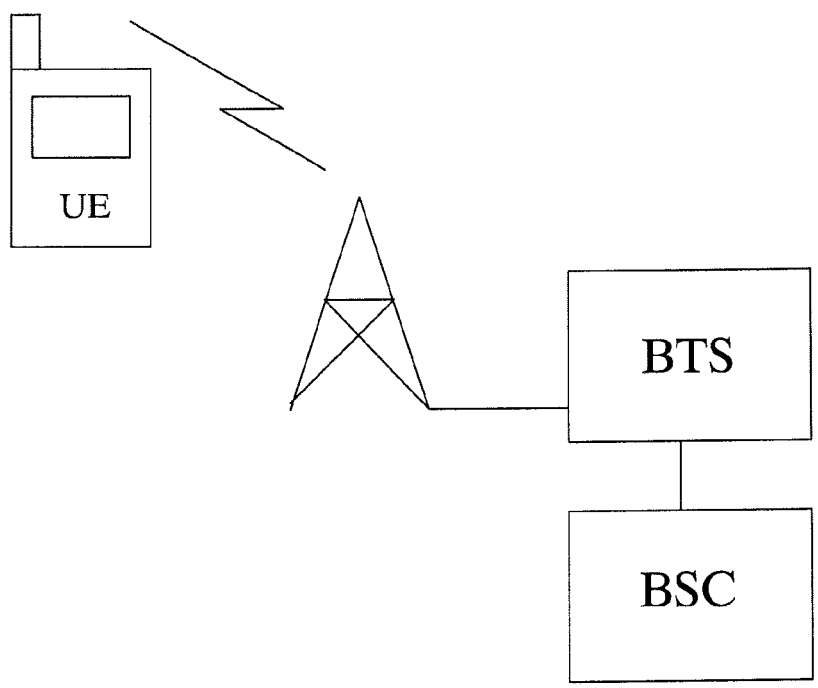
FIG. 1 is a schematic illustration of a system in which embodiments of the present invention can be implemented.
Figure 2:
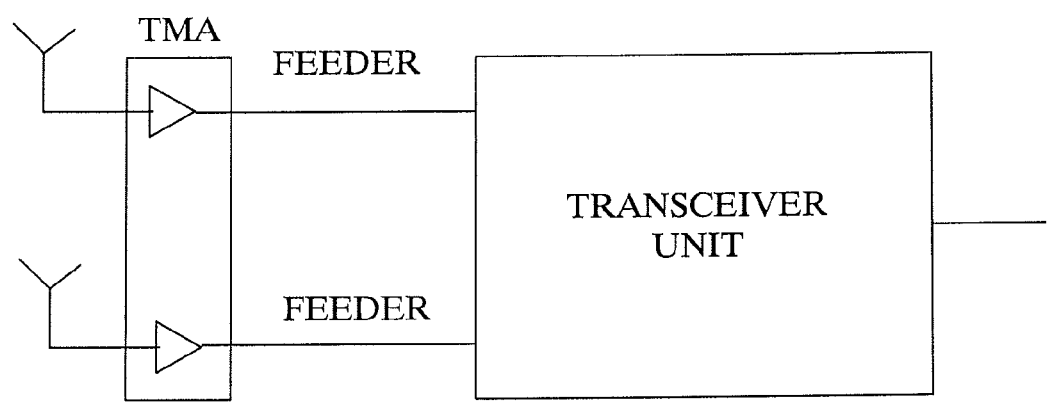
FIG. 2 is an illustration of prior art.

ARFCN Absolute Radio Frequency Channel Number
BEP Bit Error Probability
BSC Base Station Controller
BTS Base Transceiver Station
C/I Carrier to Interference Ratio
C/N Carrier to Noise Ratio
CXU Configuration Switch Unit
GSM Global System for Mobile communication
MRC Maximum Ratio Combining
NF Noise Figure
RBS Radio Base Station
RF Radio Frequency
RXQUAL Received Signal Quality
SNR Signal to Noise Ratio
TDMA Time Division Multiple Access
TMA Tower Mounted Amplifier
TRU Transceiver Unit
TRX Transceiver

DETAILED DESCRIPTION

The present invention will be described in the context of a GSM base transceiver station (BTS), however it is generally applicable to any receiving device in need of improving a signal to noise ratio.

A general aspect of the present invention concerns increasing the uplink signal to noise ratio for calls that are noise limited. For such calls, receivers that are temporarily available or empty (during a given timeslot) are utilized in order to improve the uplink signal to noise ratio. A receiver is considered empty (during a timeslot) if it is not used for any traffic or signaling during a particular moment in time. Throughout the present disclosure the term timeslot will be used, since the major part of the discussion concerns an implementation in a GSM system. However, the more general aspects of the present invention are equally applicable for a TDMA system where a timeslot forms the basic radio resource unit.

In the present invention, the same radio frequency (RF) uplink paths are used but the number of active receivers for each noise limited signal or call are doubled or more. A noise limited signal is fed to several TRX's for parallel processing. Once the signals have been converted from the analog to digital domain they can be combined in a variety of ways. For example, the output of the equalization from several TRX's can be combined by means of the so-called Chase soft combining or Maximum Ratio Combining. These improved soft values are fed to the channel decoder. This procedure results in improved receiver sensitivity.

The noise figure (NF) of a receiver is defined as the ratio between the SNR at the antenna port and the SNR at the input of the baseband unit (in dB). The NF quantifies the loss in the SNR due to imperfections or noise in the analogue components of the receiver. By processing the same signal in parallel in several TRX's the effect of the noise introduced by the analog components in the TRX is mitigated, in much the same way as the power gain in ordinary diversity is achieved. The net result is an effective decrease of the NF.

The allocation of radio resources is performed adaptively. That is, only those calls that are weak and risk to drop, will get an extra receiver. Furthermore, this is done only as long as there are resources available and there is a need. Thus, the capacity of the site is not diminished in any way, while the use of available radio resources is optimized.

Note that the idea is not the same as improving the sensitivity by going from 2-way diversity to 4-way diversity or other classical diversity schemes. In 4-way diversity, more antennas and feeders are needed. Moreover, all the radio resources are allocated permanently once the site is configured. The invention is not intended to replace the traditional diversity, but to complement it and to further improve it by an efficient utilization of all the available hardware.

The basic aspect of the embodiments of the present invention is to make use of empty receivers (i.e. receivers that are idle) and use them for calls or signals that are noise limited. By processing the same signal in parallel (in approximately the same time frame) in several TRX's, the effect of the noise introduced by the analog components in the TRX is alleviated. This is possible as long as the noise sources in the different TRX's are not completely correlated. Any known method to combine digital signals from several branches can be employed, such as Maximum Ratio Combining or Chase soft combining.

Figure 3:
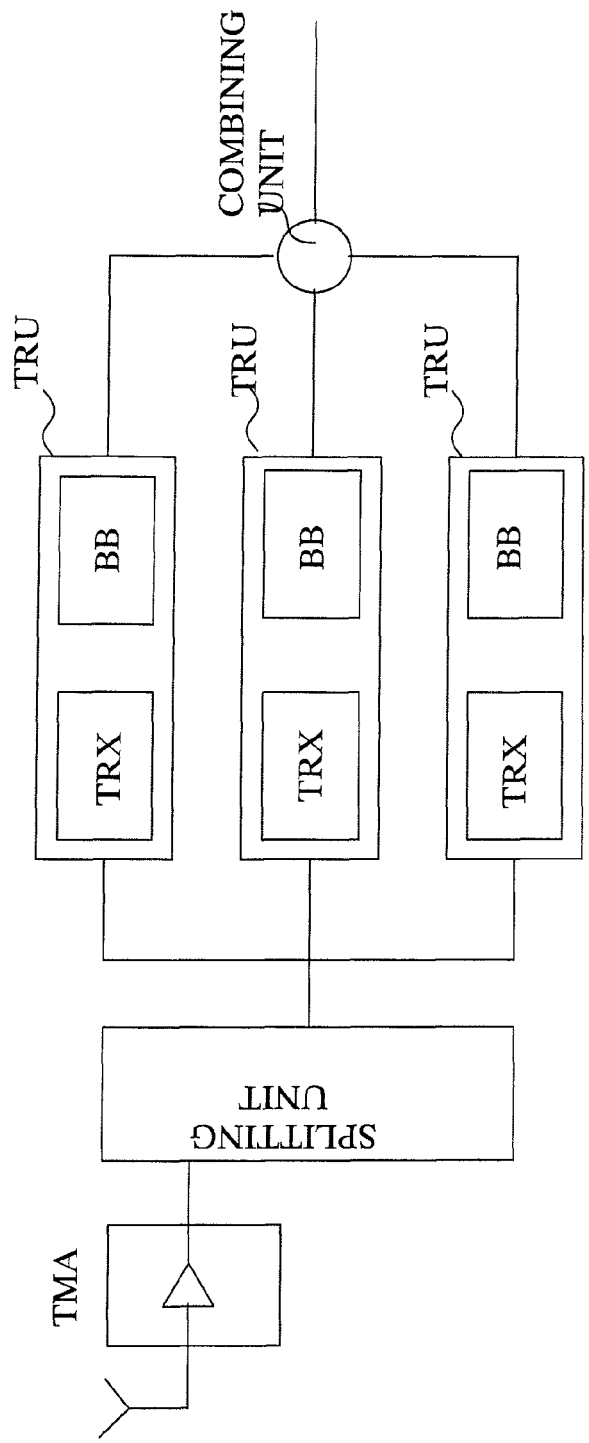
FIG. 3 is an embodiment of an arrangement according to the present invention.

With reference to the system in FIG. 3, and the flow chart of FIG. 4, an embodiment of a method of enabling improved quality for noise limited uplink signals will be described. The system comprises at least one antenna branch, an antenna amplifier (TMA), a RX splitter, and a plurality of transceiver units TX1, TX2, TX3 each including at least one receiver unit RX and conventional baseband transformation units. The output terminals of each transceiver are coupled to a combination unit.

Figure 4:
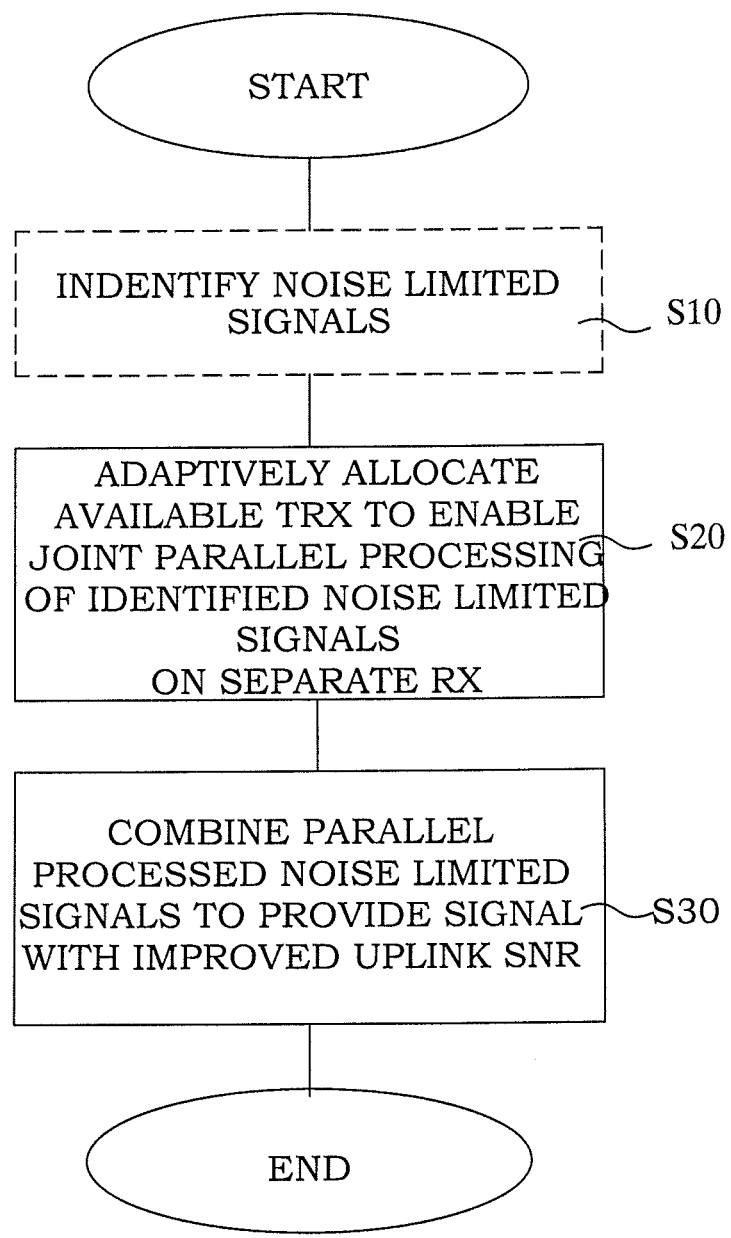
FIG. 4 is an embodiment of a method according to the present invention.

Basically, with reference to FIG. 4, in order to improve the noise figure of the receiver in a scenario with noise limited signals or calls, adaptively allocating S20 available transceiver units to enable joint parallel processing of identified noise limited signals on available parallel at least two separate receiver units in the radio base station, and combining S30 the parallel processed noise limited calls to provide a received signal with improved signal to noise ratio e.g. improved noise figure (NF).

Allocating in this sense is used to describe the process of assigning an incoming call or signal to a specific timeslot or moment in time in a specific transceiver and receiver.

Typically, a first step of actually identifying S10 an incoming signal or call in a timeslot on a receiver as being noise limited is performed. For the case of TDMA the term timeslot is used in its most general meaning. This can typically be done by estimating the raw bit error rate (e.g. as in RXQUAL or the bit error probability BEP), frame error rates or block error rates and the strength of the received signal. The equalizer may also estimate the C/I or C/N of the signal.

Figure 5:
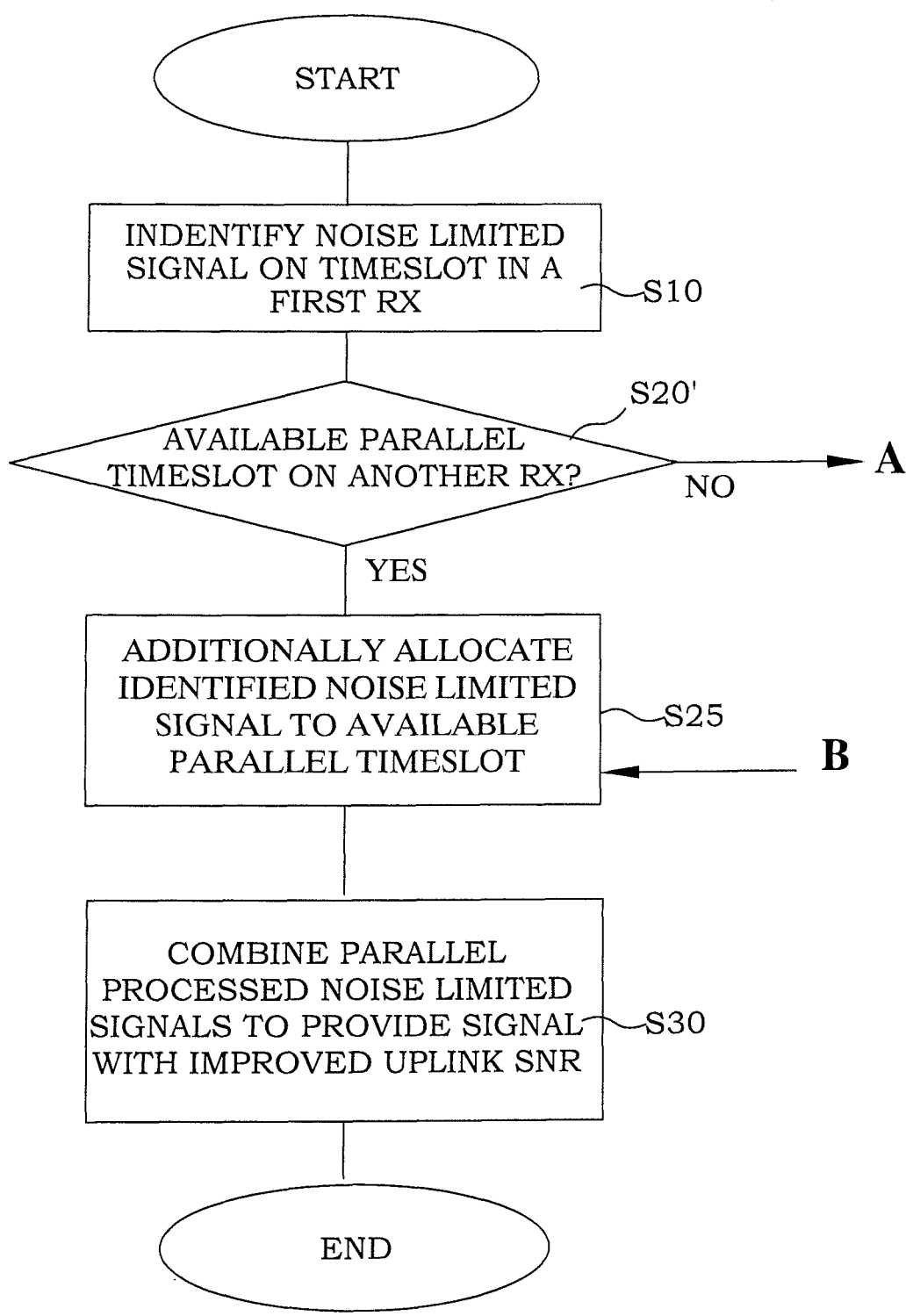
FIG. 5 is another embodiment of a method according to the present invention.

With reference to FIG. 5, a further embodiment of the method of the present invention will be described. To enable the joint and parallel processing of the same noise limited signal on two or more receivers, an available parallel timeslot to the one on which the noise limited call was located needs to be determined. A timeslot is considered parallel if it coincides in time with the timeslot under consideration. Consequently, a step of determining S20' if there is an available e.g. free, empty, parallel timeslot on at least one receiver parallel to the one on which the noise limited call was identified. If such a timeslot is determined to be available, the noise limited call is additionally allocated S25 to that available timeslot to enable parallel processing of the signal. Subsequently, the at least two processed signals are combined S30 to provide the improved signal.

Figure 6:
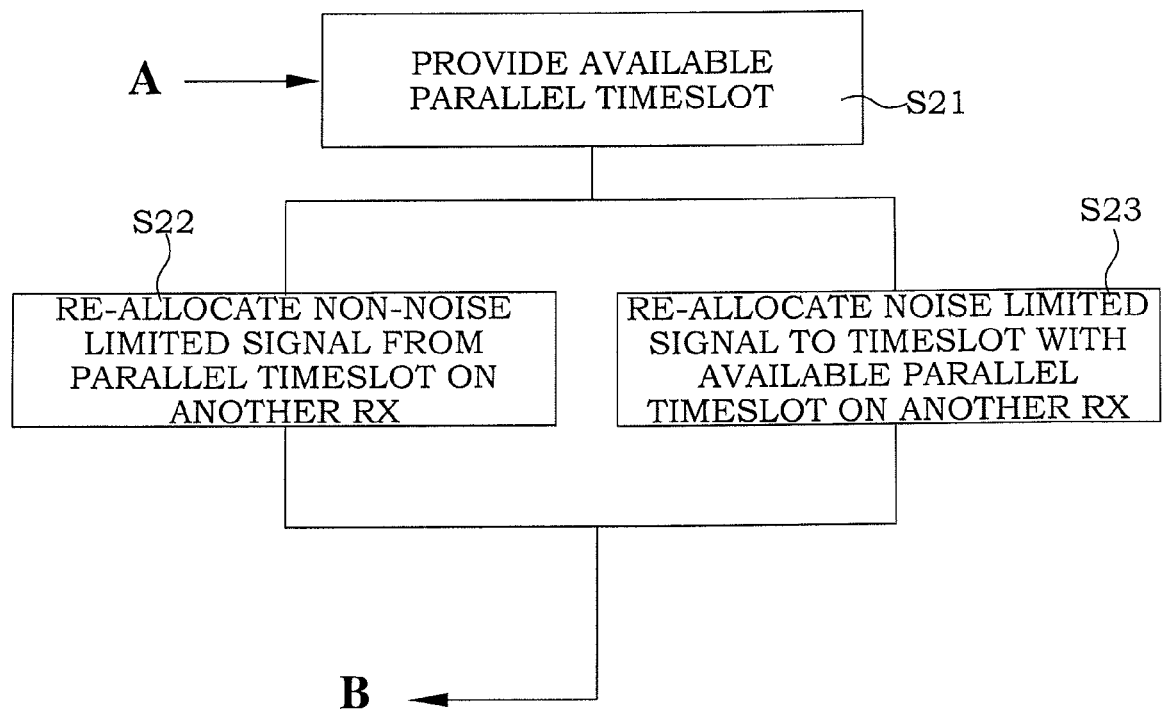
FIG. 6 is a further embodiment of a method according to the present invention.

However, with reference to FIG. 6, if there is no such available parallel timeslot, a further step of providing such a timeslot S21 is performed according to a further embodiment of a method according to the invention.

According to the embodiment, the identified noise limited call or signal is re-allocated S23 to a timeslot in a receiver which has an available parallel timeslot on another receiver. The re-allocation can be performed within the same receiver unit that the noise limited signal was first allocated to, or to another receiver unit in the system. Subsequently, the noise limited call is additionally allocated S25 to that available timeslot to enable parallel processing of the signal. Subsequently, the at least two processed signals are combined S30 to provide the improved signal.

According to a further embodiment, also with reference to FIG. 6, a non-noise limited call or signal is re-allocated S22 from a timeslot that is parallel to the timeslot on which the noise limited call was originally allocated to make the parallel timeslot available. Subsequently, the noise limited call is additionally allocated S25 to that available timeslot to enable parallel processing of the signal. Subsequently, the at least two processed signals are combined S30 to provide the improved signal. Any form of signal combining can be utilized.

An additional embodiment, not shown, comprises re-allocating both the noise limited call and a non noise limited call in order to provide a set of available parallel timeslots for joint parallel processing of the noise limited call.

Although this invention has so far been described in the context of a system where one antenna branch is used, it is equally applicable to a system where two or more antenna branches are utilized for receiving incoming signals to the base transceiver station.

The process can be described as follows (in addition to the already illustrated and described flow charts).

1. Identify calls or signals that are noise limited on the uplink. This can typically be done by estimating the raw bit error rate (e.g. as in RXQUAL or the bit error probability BEP) and measuring the signal strength. The equalizer also estimates and reports the C/I or C/N of the signal. Moreover, the receiver algorithms can determine if the source of the noise is interference from other mobile stations or if it is thermal noise. Using these statistics, the weak calls that require a boost in the SNR are identified.
2. Make sure that the noise limited call has an empty timeslot on another TRX at the same time e.g. in parallel. This can be done by moving the noise limited call to another timeslot or TRX, moving another call or both. This procedure is further described below in the document.
3. On the TRX with an empty timeslot, activate the receiver and tune into the same hopping sequence or fixed ARFCN as the noise limited call.
4. Combine the receiver information to get a higher SNR. This can be achieved by sending the digital signal from one TRX to another and then using a combination algorithm (e.g. Maximum Ratio Combining MRC), or by equalizing all the signals and then combining the soft values.

Figure 7:
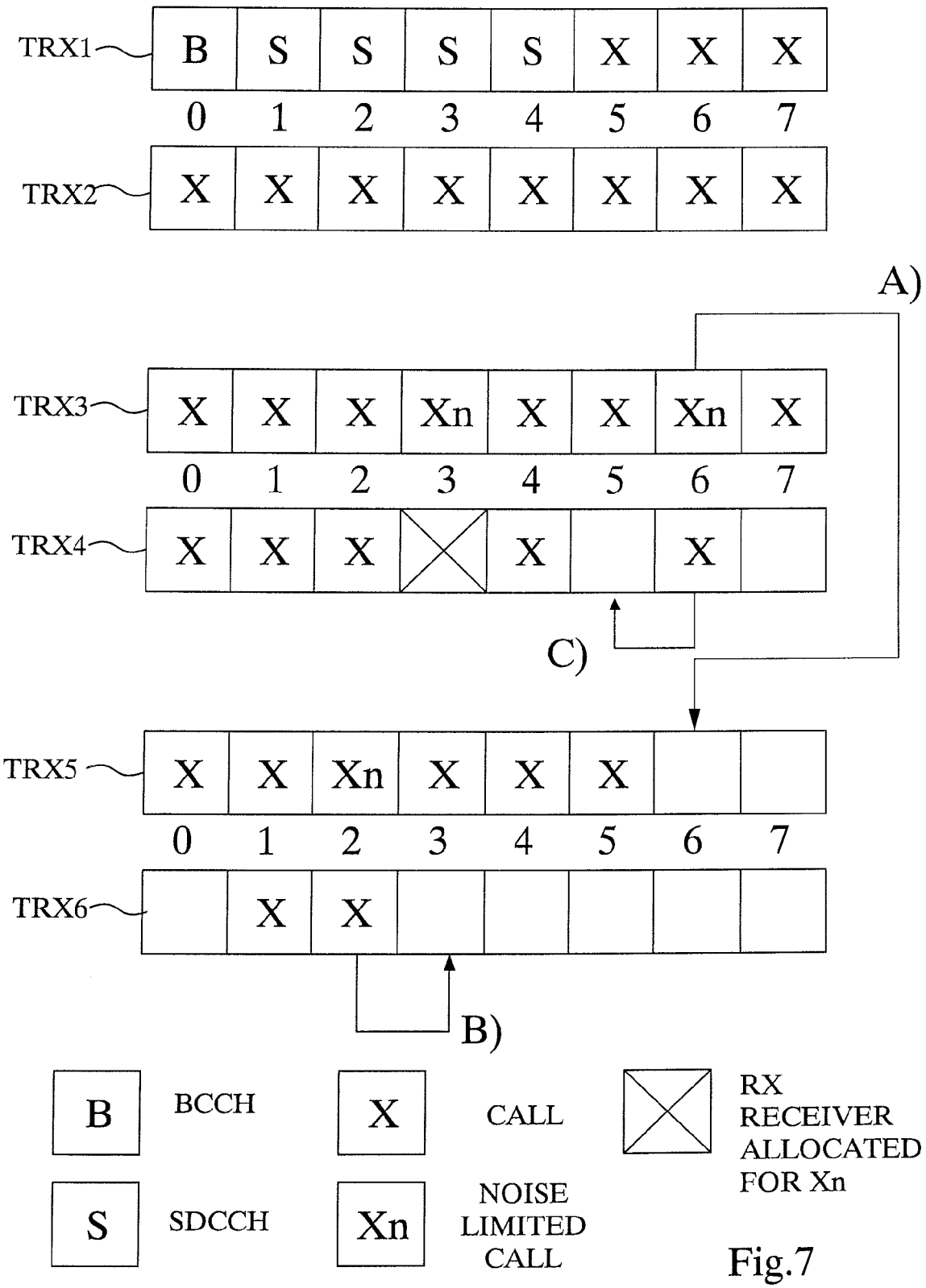
FIG. 7 is another embodiment of a method according to the present invention.

As previously described, there are different ways in which to make sure that noise limited calls get an empty TRX on the same timeslot. Three potential different ways are shown in FIG. 7. Firstly, A) the noise limited call is moved from TRX3 and timeslot 6 to TRX5 and timeslot 6. It is however a great risk to move a noise limited call. Secondly, and instead, alternative B) could be considered. In B) a non-noise limited call on TRX6 and timeslot 2 is moved to timeslot 3 and in this way empty the TRX6 timeslot 2 receivers to be used together with the noise-limited call on TRX5 timeslot 2. Finally, according to example C) the non-noise limited call or signal on timeslot 6 in TRX4 can be moved to timeslot 5 on the same TRX. Subsequently, the noise limited call on timeslot 6 in TRX3 can utilize timeslot 6 on all receivers TRX4, TRX5, TRX6.

Note that FIG. 7 shows a cell with six TRX's in a typical RBS configuration.

The embodiments of a method according to the present disclosure typically requires new software or adaptation of existing software (or hardware) in both the BTS and the BSC. The BTS needs to be able to activate a receiver, tune this to a hopping sequence of another call, and then, combine this information to get a higher SNR. The BSC must be able to move traffic in order to empty timeslots and thus free receivers if necessary. In addition, the BSC must keep track of what receivers on what timeslots that are used to support noise-limited calls so that no new calls are allocated on these timeslots. An example of such a timeslot is the timeslot 3 on TRX4 in FIG. 7.

Figure 8:
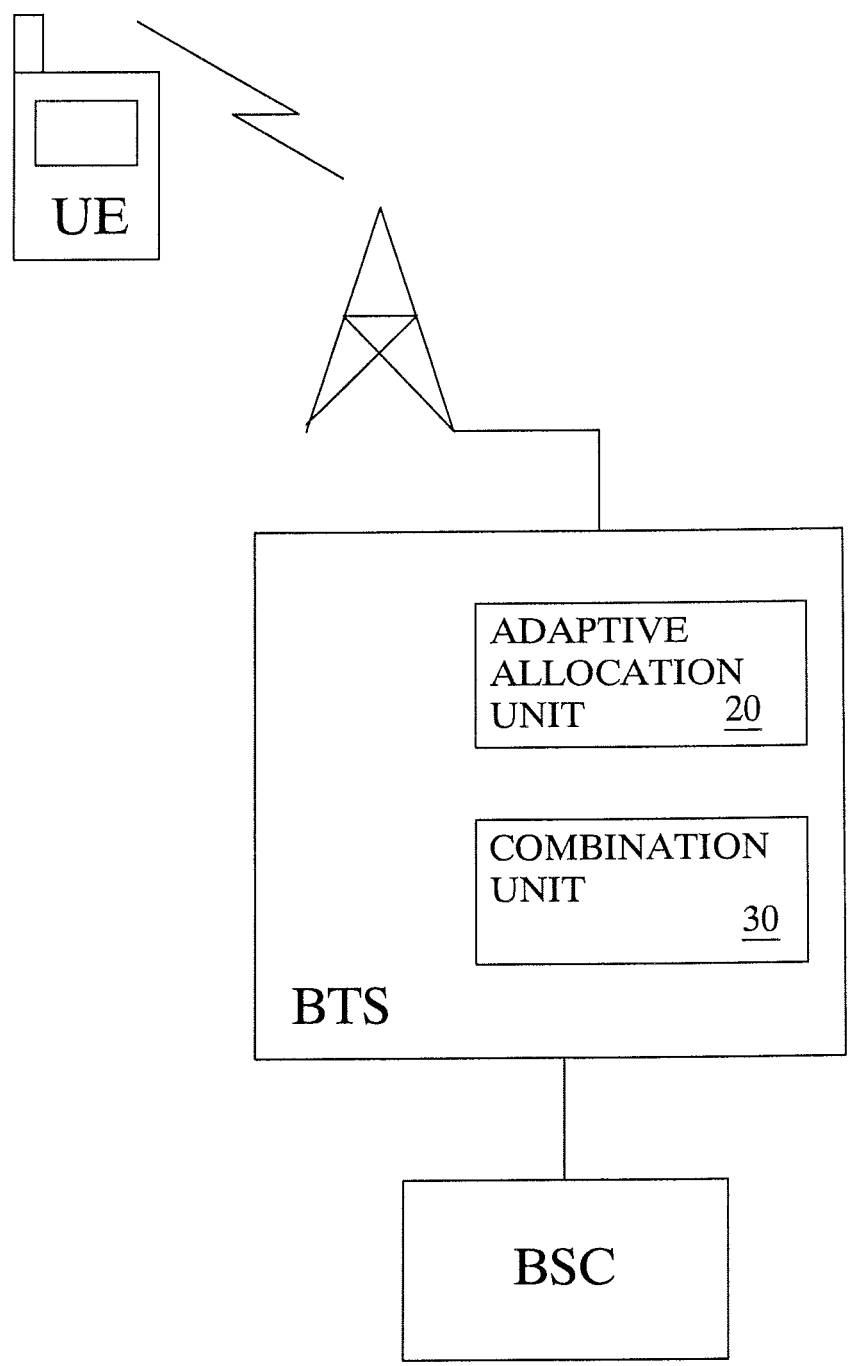
FIG. 8 is a schematic illustration of an arrangement according to the present invention.

Consequently, with reference to FIG. 8, an arrangement adapted for enabling the embodiments of methods in a telecommunication system according to the present invention typically comprises a unit 20 for adaptively allocating available transceivers to provide parallel processing of received noise limited signals on at least two separate available receivers, and a unit 30 for combining the parallel processed signals and provide a received signal with improved signal to noise ratio. Preferably, this arrangement is provided in a radio base station in a telecommunication system. Specifically, the adaptively allocating unit 20 needs to be adapted to identify and activate a plurality of receivers for a same signal. In addition, the arrangement needs to be responsive to instructions concerning allocation from a base station controller BSC, also shown in FIG. 8.

In addition, the base station controller BSC in the telecommunication system typically is adapted to stay informed concerning active and available receivers (e.g. timeslots on the receivers), and to adaptively allocate incoming noise limited signals to enable the parallel processing on multiple receivers.

It is suggested that if the cell is carrying a lot of traffic and thus is close to congestion and at the same time have timeslots where the receiver is supporting calls that are noise limited then the BSC should order the BTS to stop support noise limited calls, i.e. the timeslots where only the receivers are used, timeslot 3 on TRX4 in FIG. 8, should be available for a new call. This means, when congestion occurs in a cell, then the noise-limited calls do not get any extra receiver.

The more receivers that can be used the better, and there is no theoretical limit to the number of extra receivers that can be added. As the base station technology advances and components are miniaturized, several receivers (4, 6 or more) may share the same physical card. Although this is not a requirement for the present invention, it may facilitate its implementation.

The BSC may also perform allocation of radio resources in order to optimize the performance of the procedure described above. For example, the BSC could try to avoid allocating two weak; noise limited signals in TRU's that share the same physical card. Instead, noise limited signals are assigned to TRU's located in different physical cards.

Advantages of the Present Invention Include:

Improved SNR for calls that are noise limited, resulting in improved coverage.

This improvement can be implemented with only software upgrades in the BTS and BSC. Better sensitivity is achieved by means of a more efficient utilization of available resources.

The invention can be easily implemented in legacy hardware.

It will be understood by those skilled in the art that various modifications and changes may be made to the present invention without departure from the scope thereof, which is defined by the appended claims.

The invention claimed is:

1. A method of improving the quality of noise limited uplink signals in a radio base station in a telecommunication system, said radio base station comprising a plurality of transceiver units, each comprising one or more receiver units, the method comprising:
    adaptively allocating available transceiver units to enable joint parallel processing of an identified noise limited signal on at least two separate said receiver units in said radio base station;
    identifying a noise limited signal on a timeslot in a first receiver unit of said receiver units;
    determining if there is an empty parallel timeslot on at least a second receiver unit of said receiver units; and
    combining said joint parallel processed noise limited signal to provide a received signal with improved signal to noise ratio,
    further comprising providing an empty parallel timeslot if there is no determined empty parallel timeslot.

2. The method according to claim 1, wherein, if there is no determined empty parallel timeslot, re-allocating a non-noise limited signal from a parallel timeslot to provide an empty parallel timeslot in said second receiver unit, and additionally allocating said noise limited signal to said provided empty parallel timeslot.

3. The method according to claim 1, wherein, if there is no determined empty parallel timeslot, re-allocating said identified noise limited signal to an empty timeslot which has an empty parallel timeslot on at least second receiver unit, and additionally allocating said noise limited signal to said provided empty parallel timeslot.

4. The method according to claim 3, further comprising re-allocating said identified noise limited signal to a timeslot within said first receiver.

5. The method according to claim 3, comprising re-allocating said identified noise limited signal to an empty timeslot in a transceiver unit of said transceiver units that comprises said at least two separate receiver units, wherein a timeslot in one of said at least two separate receiver units has an empty parallel timeslot on another of said at least two separate receiver units, and additionally allocating said noise limited signal to said empty parallel timeslot.

6. An arrangement circuit for improving the quality of noise limited uplink signals in a radio base station in a telecommunication system, said radio base station comprising a plurality of transceiver units, each comprising one or more receiver units, wherein the arrangement circuit comprises:
   an adaptive allocation unit configured to adaptively allocate available transceiver units to enable joint parallel processing of an identified noise limited signal on empty parallel timeslots on at least two separate said receiver units in said radio base station, wherein the adaptive allocation unit is further configured to identify a noise limited signal on a timeslot in a first receiver unit of said receiver units and determine if there is an empty parallel timeslot on at least a second receiver unit of said receiver units; and
   a combination unit configured to combine said joint parallel processed noise limited signal to provide a received signal with improved signal to noise ratio,
   wherein the adaptive allocation unit is configured to provide an empty parallel timeslot if there is no empty parallel timeslot.

7. The arrangement circuit according to claim 6, wherein, if there is no determined empty parallel timeslot, the adaptive allocation unit is configured to re-allocate a non-noise limited signal from a parallel timeslot to provide an empty parallel timeslot in second receiver unit, and additionally allocate said noise limited signal to said provided empty parallel timeslot.

8. The arrangement circuit according to claim 6, wherein, if there is no determined empty parallel timeslot, the adaptive allocation unit is configured to re-allocate said identified noise limited signal to an empty timeslot which has an empty parallel timeslot on at least said second receiver unit, and additionally allocate said noise limited signal to said provided empty parallel timeslot.

9. The arrangement circuit according to claim 8, wherein the adaptive allocation unit is configured to re-allocate said identified noise limited signal to a timeslot within said first receiver.

10. The arrangement circuit according to claim 8, wherein the adaptive allocation unit is configured to re-allocate said identified noise limited signal to an empty timeslot in a transceiver unit of said transceiver units that comprises said at least two separate receiver units, wherein a timeslot in one of said at least two separate receiver units has an empty parallel timeslot on another of said at least two separate receiver units, and additionally allocate said noise limited signal to said empty parallel timeslot.

11. A base station in a telecommunication system, comprising an arrangement circuit for improving the quality of noise limited uplink signals in the base station, the base station comprising a plurality of transceiver units, each comprising one or more receiver units, wherein the arrangement circuit comprises:
   an adaptive allocation unit configured to adaptively allocate available transceiver units to enable joint parallel processing of an identified noise limited signal on empty parallel timeslots on at least two separate said receiver units in said radio base station, wherein the adaptive allocation unit is further configured to identify a noise limited signal on a timeslot in a first receiver unit of said receiver units and determine if there is an empty parallel timeslot on at least a second receiver unit of said receiver units, wherein the adaptive allocation unit is configured to provide an empty parallel timeslot if there is no empty parallel timeslot; and
   a combination unit configured to combine said joint parallel processed noise limited signal to provide a received signal with improved signal to noise ratio.

12. The method according to claim 1, further comprising additionally allocating said noise limited signal to a determined empty parallel timeslot on at least second receiver unit.

13. The method according to claim 1, wherein said combining comprises soft combining.

14. The arrangement circuit according to claim 8, wherein the adaptive allocation unit is configured to additionally allocate said noise limited signal to a determined empty parallel timeslot on at least said second receiver unit.

* * * * *